(No Model.) 2 Sheets—Sheet 1.
J. W. T. OLÁN.
ELECTRIC METER.
No. 455,575. Patented July 7, 1891.
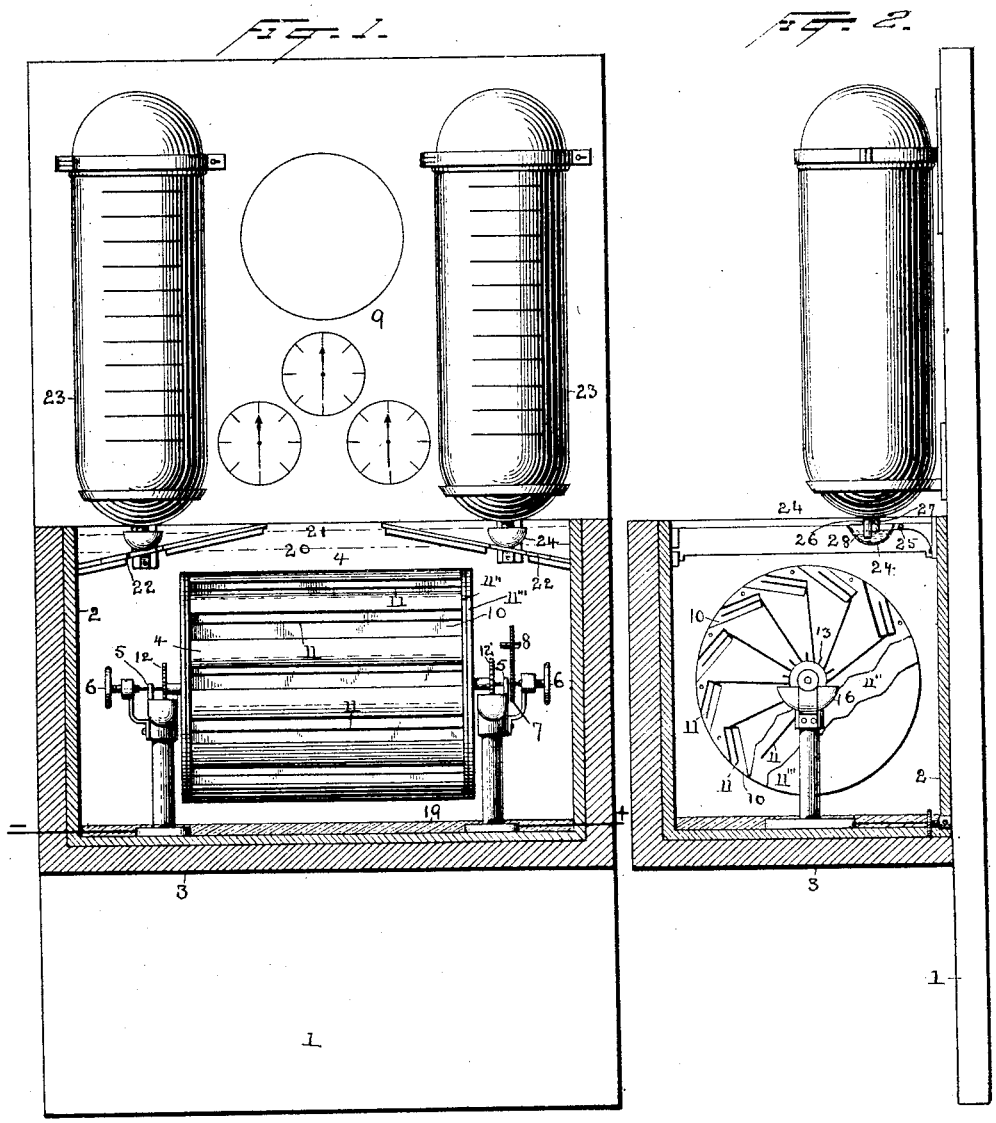
Witnesses
Norris A. Clark
N. F. Oberlé
Inventor
J. W. T. Olán
By his Attorneys
Dyer & Seely

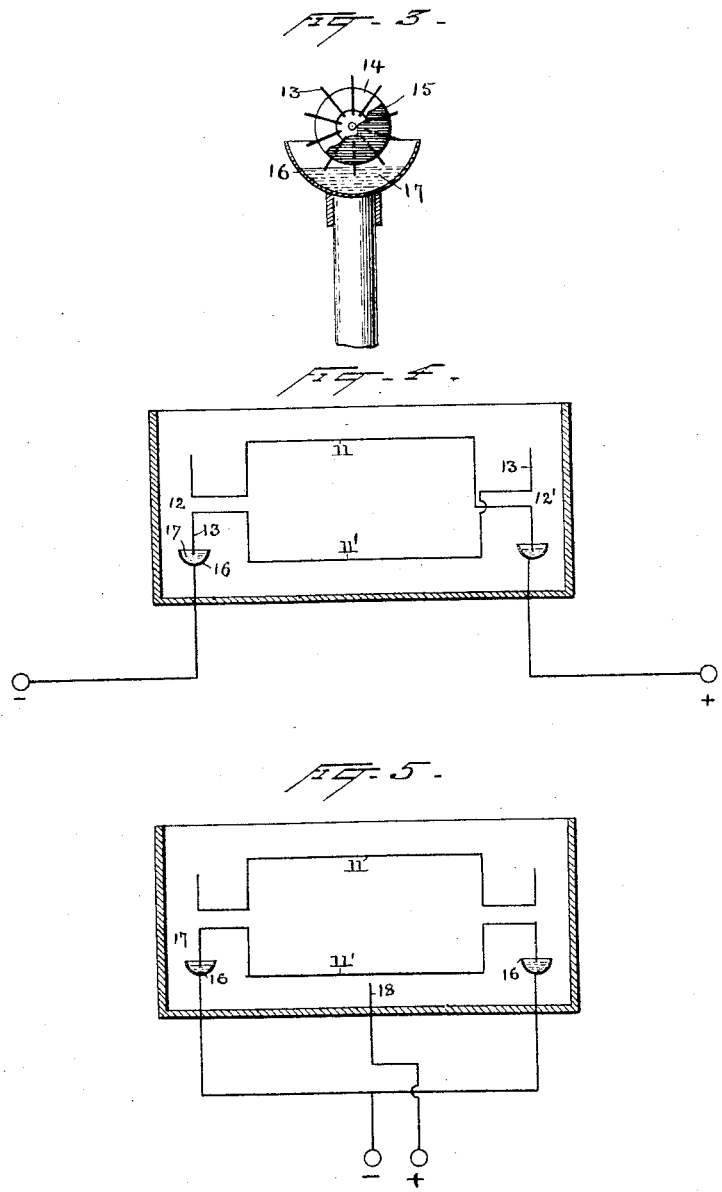

UNITED STATES PATENT OFFICE.

JOHAN W. TH. OLAN, OF NEW YORK, N. Y., ASSIGNOR OF ONE-HALF TO EDWARD H. JOHNSON, OF SAME PLACE.

ELECTRIC METER.

SPECIFICATION forming part of Letters Patent No. 455,575, dated July 7, 1891.

Application filed December 29, 1890. Serial No. 376,063. (No model.)

*To all whom it may concern:*

Be it known that I, JOHAN W. TH. OLAN, a subject of the King of Sweden, residing at New York, county and State of New York, have invented a certain new and useful Improvement in Electrical Meters, of which the following is a specification.

The present invention relates to devices for measuring electricity by means of a rotator propelled by gas produced by decomposition of an electrolyte by the current or by a known fraction of the current to be measured.

The invention consists in a method and in an apparatus for the purpose mentioned, as hereinafter set forth.

The invention is illustrated in the accompanying drawings, in which—

Figure 1 is a face view of the meter, the inclosing vessel being shown in section. Fig. 2 is a side view thereof, partially in section. Fig. 3 is a detail view of a commutator or circuit-controller used in the meter. Fig. 4 is a diagram illustrating the circuits in the preferred form, and Fig. 5 is a diagram illustrating the circuits in a modified form.

On a base-board 1 I mount a glass or other vessel 2, preferably protecting the same by means of an iron or wooden inclosing box 3, which, if desired, may be extended over the indicator and other apparatus above the vessel. Within the glass vessel a wheel, cylinder, or other similar rotator 4 is mounted so as to revolve. The journals or bearings are shown at 5. This body is preferably of a material having substantially the same specific gravity as that of the liquid electrolyte which is placed in the vessel, filling the space around the rotator when the meter is to be used, or, what amounts to the same thing, the weight of the rotating body equals the weight of the volume of liquid which is displaced thereby. It will be evident that the material selected for the body will depend on the specific gravity of the liquid used as an electrolyte. If the body employed is lighter or heavier than the electrolyte, it can be made of proper weight by connecting therewith pieces of heavier material in one case or lighter material in the other case. I have found wood and hard rubber to be good materials to use for this part of the meter. In this way the minimum friction is obtained at the bearings of the rotator. The axis is movable longitudinally, and to steady said axis and to move the same when desired two screws 6 6 are provided bearing against the two ends of the axis. By retracting one screw and by moving the opposite screw forward the position of the axis can be varied—for example, to throw the gear-wheel 7 out of engagement with the wheel 8, which is the first of a train of wheels by means of which the indicator 9 is propelled. This indicator is supposed to be of the ordinary variety, in which several pointers are advanced each over its own scale to measure units, tens, hundreds, &c. The indexes on the dials will be graduated to indicate the units in which the electrical measurement is to be expressed. It is deemed unnecessary to show the indicator mechanism in detail or to show the connecting mechanism between the indicator and the wheel 8, since this may be of any well-known or suitable arrangement. The rotating body is provided at regular intervals around its periphery with cups, pockets, or similar receptacles, all of which point in the same direction, and which are arranged obliquely, as shown in Fig. 2. With this arrangement it will be seen that on one side of the rotator the pockets 10 point downward, while on the opposite side they point upward. Across the rotator, and preferably in or near the mouth of the pockets, I place conductors 11. These conductors are insulated at the ends of the cylinder, being tightly inclosed between two insulating-disks 11″ 11‴, as shown in Fig. 2, where the disk 11‴ is broken away below the disk 11″ to show one of the conductors in the position which it occupies between the disks. Said conductors extend from commutator 12 at one end of the rotator to commutator 12′ at the opposite end.

The commutators are constructed as follows, and as shown most clearly in Fig. 3: Several wires 13, one for each wire leading across the rotator, radiate as shown, each insulated from the other, and preferably insulated throughout the greater portion of their length, but having a short uninsulated portion at the outer end. In the form illustrated in Fig. 3 the radiating wires are held between two insulating-disks 14 15, and are thereby insulated. Below the commutator is supported a cup 16, containing mercury 17 or other suitable conducting-liquid. Each cup is connected with one of the terminals of the circuit, as indicated by the binding-posts +  =. The commutator at the = side of the meter is so arranged that the wire dipping into the mercury leads to a wire in a pocket near the bottom of the rotator, but at one side of the center. The circuit connections are indicated in Fig. 4, which shows two of the wires, supposed to be two wires arranged diametrically opposite on the rotating cylinder. Wire 11 is connected with a radiating wire in the commutator, which extends downward into its mercury-cup at the + end, but at the opposite end is connected to a radial wire which extends upward. The wire 11' is oppositely connected. The wires 11 are alternately connected to the + and to the = terminals, and their polarization is thus prevented.

In Fig. 5 the circuits are arranged differently. The two mercury-cups 16 are both connected to one terminal of the circuit. The opposite terminal of this circuit connects with a wire 18 adjacent to wire 11', which is supposed to be a wire occupying one of the lower positions a short distance to the left of the axis of the rotator shown in Fig. 2. When the meter is to be used, a layer of paraffine 19 is placed in the bottom of the vessel to cover the metal parts of the standards and the leading-in wires. An electrolyte, preferably acidulated water, is then placed in the vessel and extends about to the line 20, Fig. 1, thus entirely inclosing the rotator. A layer of oil 21 is placed over the electrolyte to prevent evaporation. The vessel is partially covered by glass or other plates 22. These plates are so placed that they do not prevent escape of gas and do not prevent the necessary movement of the floats. They also serve to prevent the acid or other solution in the vessel from being thrown up against the reservoirs, thereby protecting them from corrosion. Over the vessel are one or more reservoirs 23, containing distilled water or other liquid for replacing the liquid decomposed by the current. This replacement is effected automatically in the following manner: A float 24, in the form of a cup pivoted at 25, is held up when the vessel is full against the pipes 26 27, leading out of the bottom of the reservoir, and closes the same, the water 28 in the cup covering the outlet of each tube. The tube 27 is preferably a little shorter than 26, for a purpose hereinafter described. The surfaces of the reservoirs are preferably graduated, so that the amount of liquid therein, as shown by the scale, gives an indication of the amount of water which has been decomposed by the current in the vessel, and hence forms a check on the indicator proper.

The operation of the meter is as follows: Current enters at the + terminal, (see Fig. 4,) passing through the mercury to commutator 12', and to the radial wire extending downward into the mercury, thence to the wire leading along the end of the rotating cylinder to a cross-wire 11 near the top of the rotator. As above explained, the opposite end of this cross-wire is disconnected from the mercury in its cup. To reach the negative terminal, the current passes from wire 11 through the liquid to wire 11', which corresponds to the wire in the lower open pocket. (Shown in Fig. 2.) By this passage of the current through the electrolyte gas is generated. One of the gases collects at the wire connected with the negative terminal and enters the cup or pocket adjacent to which said conductor is mounted, forcing the water out therefrom, and by reason of its buoyant effect—that is, by reason of its lightness—tends to rotate the cylinder. The other gas which collects at the wire diametrically opposite does not enter a pocket, but freely escapes. In the arrangement of circuits indicated in Fig. 5 both the hydrogen and oxygen would collect in one of the lower pockets and would conspire to cause rotation of the cylinder, since both the + and = terminals are connected to wires adjacent to the same pocket. It will be seen from Fig. 3 that two of the radial wires of the commutator simultaneously are in contact with the mercury, and that at the moment one wire leaves the mercury a succeeding wire enters it. In this way the circuit is kept constantly closed through two of the lower wires. As the level of the electrolyte falls the floats 24 move downward on their pivots, the ends of the shorter tube 27 become uncovered, and air enters the reservoir, allowing a quantity of liquid to run out of the longer tube and to overflow into the vessel until the float is again raised. The effect of this is to maintain the concentration of the electrolyte at a constant point.

It will be seen that my invention is not dependent on the particular form of rotator employed or on the materials used for the electrolyte or on the particular arrangement of conductors set forth; but, Having described my invention, what I claim is—

1. The method of measuring electricity, which consists in decomposing an electrolyte into its constituent gases at successive pockets in a rotating body by means of the current to be measured, rotating said body by the buoyancy of the gases thus produced, and moving an indicator in accordance with movement of said body, substantially as described.

2. The combination, in an electrical meter, of a vessel adapted to hold a fluid electrolyte, a body having pockets at its periphery and being mounted to rotate within said vessel, conductors in or adjacent to said pockets, and means for connecting the desired conductors to the external circuit, substantially as described.

3. The combination, in an electrical meter, of a vessel adapted to hold a fluid electrolyte, a body having pockets at its periphery and being mounted to rotate within said vessel, conductors in or adjacent to said pockets, and commutators connected to the conductors at the two ends of the rotating body, substantially as described.

4. The combination, in an electrical meter, of a rotating body having pockets around it, and conductors extending across the body and being connected oppositely to two commutators, substantially as described.

5. The combination, in an electrical meter, of a vessel, a rotating body therein, and a liquid having approximately the same specific gravity as the body, whereby friction at the bearings is reduced, substantially as described.

6. The combination, in an electrical meter, of a vessel adapted to hold an electrolyte, a cylinder having grooves at its periphery and mounted to rotate in the vessel, a conductor for each groove, and means for connecting the conductors to the external circuit, substantially as described.

7. The combination, in an electrical meter, of a vessel adapted to hold an electrolyte, a cylinder having grooves around its periphery and mounted to rotate in the vessel, a conductor for each groove, and means for connecting the conductor to the external circuit, and an indicator moved by said body, substantially as described.

8. The combination, in an electrical meter, of a vessel adapted to hold an electrolyte, a rotating body therein, said body having pockets around it, conductors extending across said body and connected to commutators, and cups containing mercury or its equivalent, into which the sections of the commutators may successively dip, substantially as described.

9. A commutator for eletrical meters, &c., consisting of several independent radiating conductors insulated except at their ends, and a cup adapted to be connected to a circuit and containing a conducting-liquid into which the uninsulated ends of the conductors can sucessively dip, substantially as described.

10. The combination, in an electrical meter, of a vessel adapted to hold an electrolyte, means for decomposing said electrolyte by an electrical current, and a reservoir of liquid to keep the electrolyte at the same height in the vessel, the outlet of the reservoir being controlled by a change of level of the fluid in the vessel, substantially as described.

11. The combination, in an electrical meter, of a vessel adapted to hold an electrolyte, means for decomposing said electrolyte by an electrical current, and a reservoir of liquid to keep the electrolyte at the same height in the vessel, the outlet of the reservoir being controlled by a change of level of the electrolyte, substantially as described.

12. The combination, in an electrical meter, of a vessel adapted to hold an electrolyte, a reservoir above the same adapted to hold water, and a pivoted float covering the outlet of the reservoir and adapted to rest in the electrolyte and moved by a change of level of the electrolyte, substantially as described.

13. The combination, in an electrical meter or other apparatus, of a reservoir adapted to hold two liquid-pipes at the bottom thereof, one pipe being longer than the other, and a cup adapted to hold water and to close said pipes, substantially as described.

14. The combination, in an electrical meter or other apparatus, of a reservoir adapted to hold water, two pipes at the bottom thereof, one pipe being longer than the other, and a pivoted cup-float adapted to contain water and to close said pipes, whereby when said float falls the shorter tube is uncovered and air enters the reservoir and water runs out of the reservoir to restore the level in the vessel, substantially as described.

15. The combination, in a meter, of a body having buckets at its periphery mounted to rotate, an indicator operated by said body, and means for moving the axis of the body to throw it into or out of engagement with the indicator mechanism, substantially as described.

16. The combination, in a meter, of a body having buckets at its periphery mounted to rotate therein, an indicator operated by said body, and an adjusting-screw bearing against each end of the axis of said body for steadying and adjusting it, substantially as described.

17. The combination, in an electrical meter, of a vessel adapted to contain an electrolyte, mechanism mounted to be revolved therein by means of gas produced by decomposition, and plates partially covering the vessel, substantially as described.

This specification signed and witnessed this 26th day of December, 1890.

JOHAN W. TH. OLAN.

Witnesses:
C. M. CATLIN,
J. A. YOUNG.